Jan. 8, 1963     L. Z. FREELAND     3,072,366
FLUID SUSTAINED AIRCRAFT
Original Filed Dec. 7, 1960     5 Sheets-Sheet 1
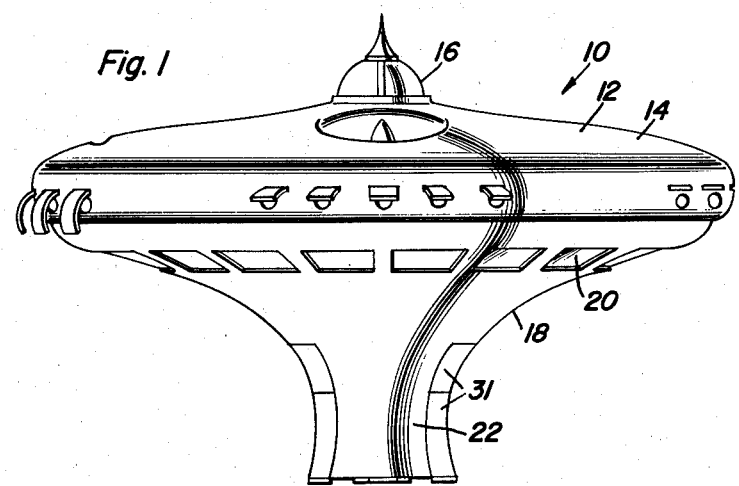
Fig. 1
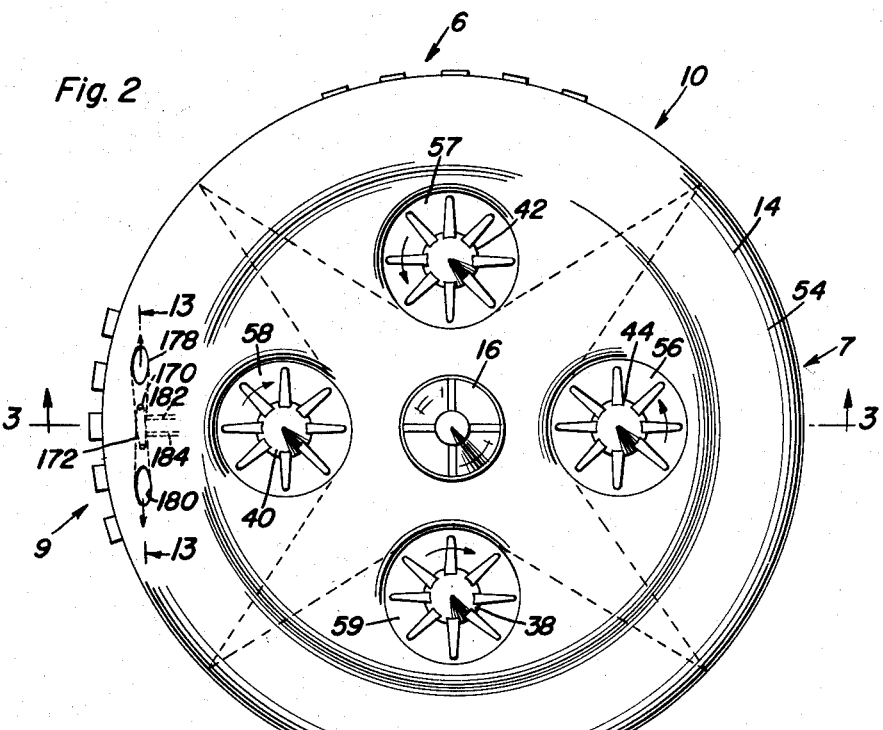
Fig. 2
Fig. 13
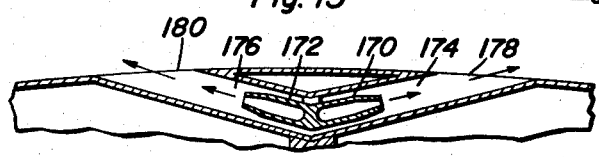
Leonor Zalles Freeland
INVENTOR.
BY

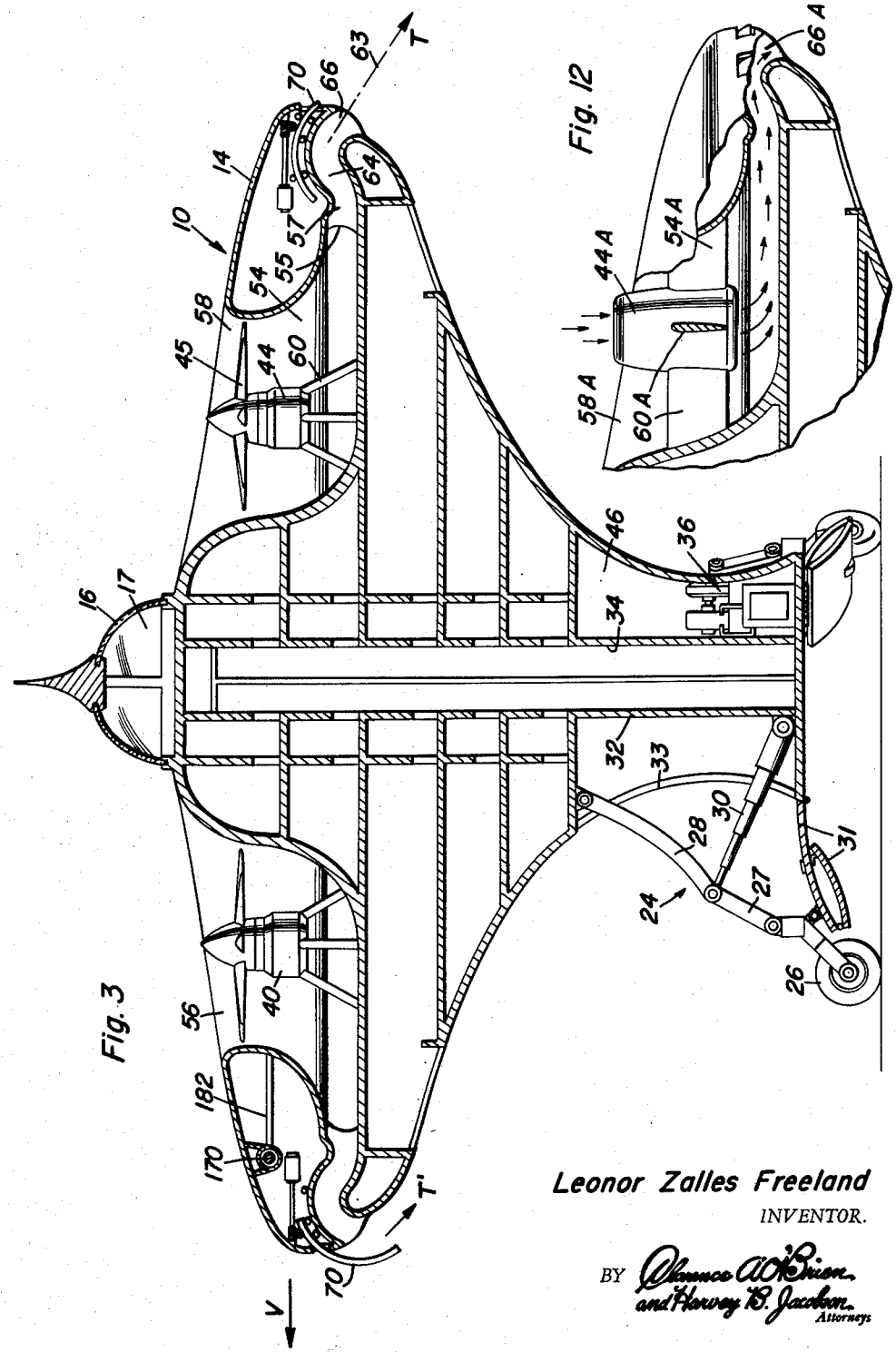

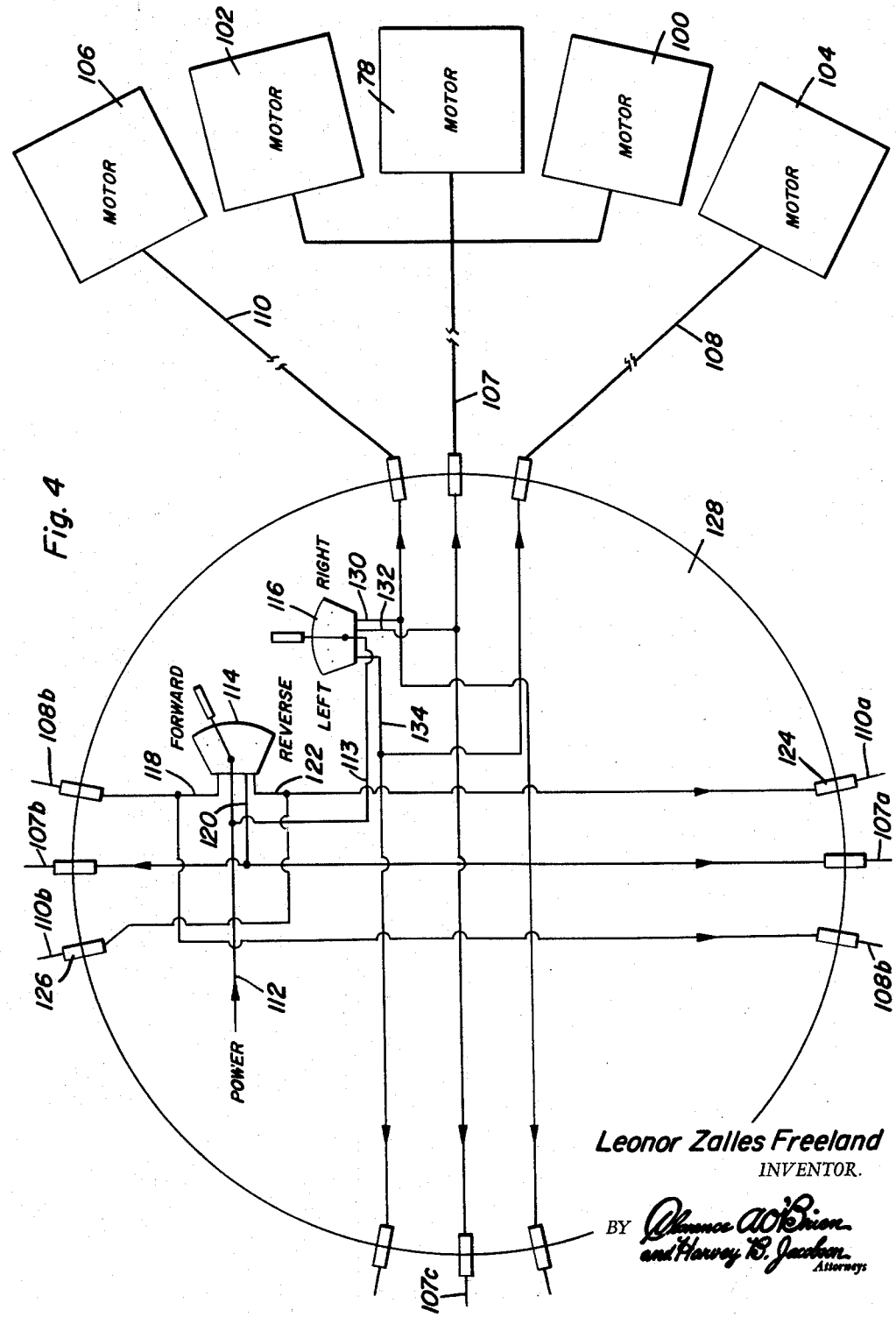

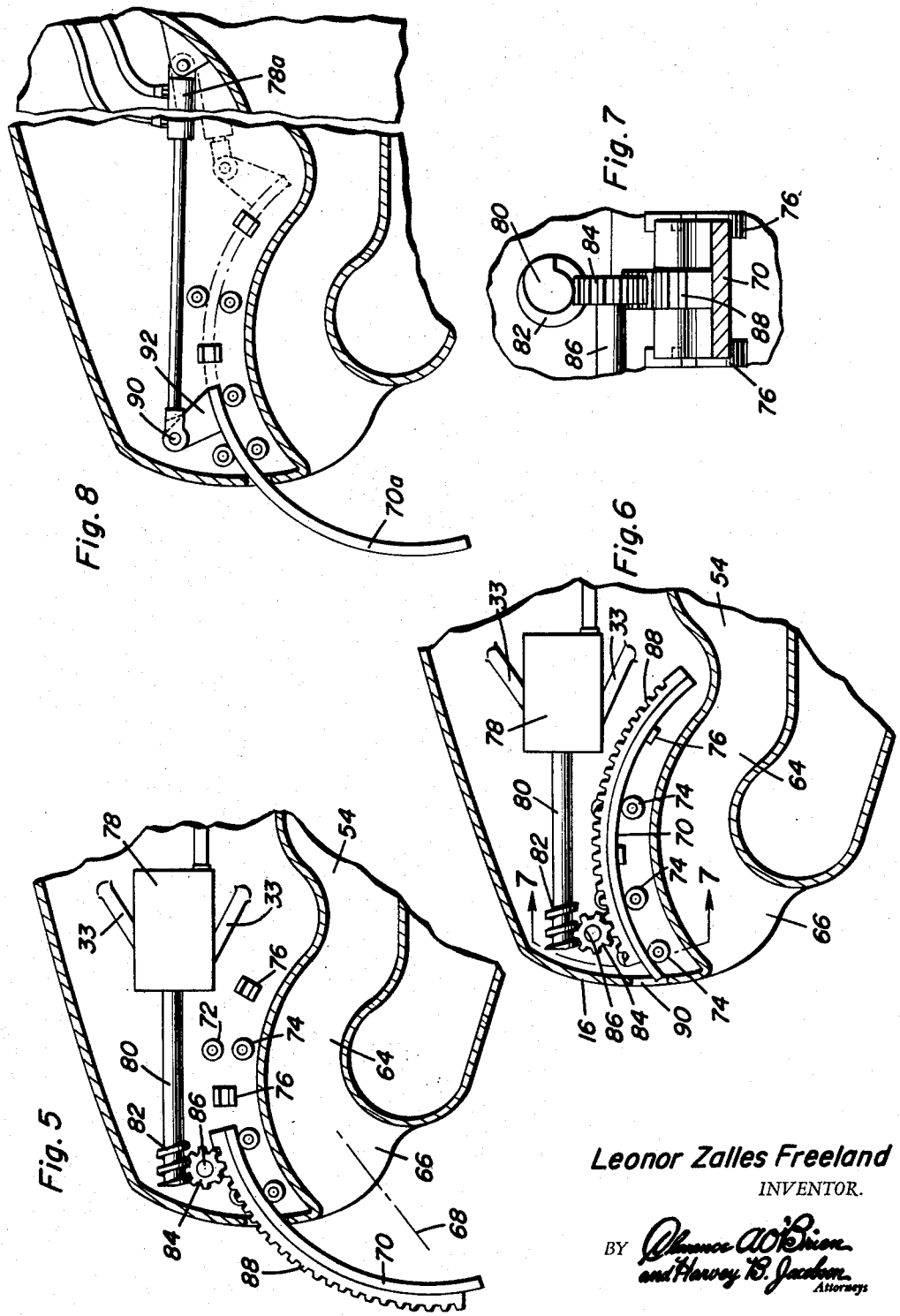

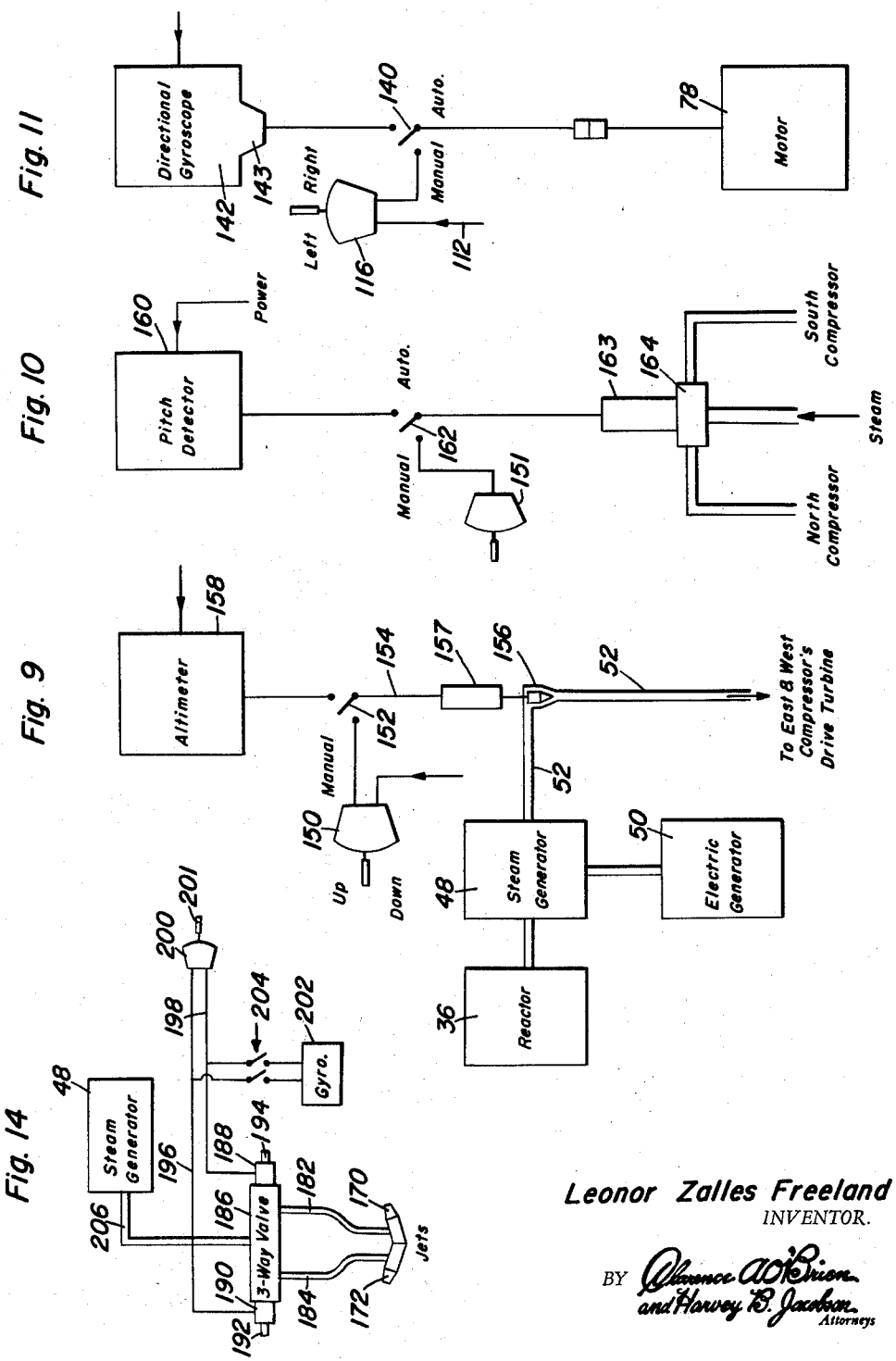

United States Patent Office 3,072,366
Patented Jan. 8, 1963

3,072,366
FLUID SUSTAINED AIRCRAFT
Leonor Zalles Freeland, 4803 Grantham Ave.,
Chevy Chase, Md.
Continuation of application Ser. No. 75,047, Dec. 7, 1960. This application Oct. 30, 1961, Ser. No. 149,487
8 Claims. (Cl. 244—23)

This application is a continuation of application U.S. Ser. No. 75,047, filed December 7, 1960, now abandoned which is a continuation-in-part application of U.S. Ser. No. 858,446, filed December 9, 1959, now abandoned, and which in turn is a continuation-in-part application of U.S. Ser. No. 566,650, filed February 20, 1956, now abandoned.

This invention relates to a class of aircraft capable of vertical flight, hovering and lateral flight.

An object of the invention is to provide a safe aircraft which is capable of vertical flight and of various maneuvers which a conventional aircraft cannot achieve. For example, an aircraft in accordance with the invention may fly horizontally or vertically or in any direction therebetween. Further, the aircraft is capable of hovering or descending very slowly in accordance with the desires of the pilot.

Although there have been prior airplanes capable of vertical flight, it is quite well known that they have lacked stability. This includes the type of aircraft having one or more engines providing thrust and sustaining wings connected to the fuselage, and not to the helicopter class of aircraft.

True helicopters have the drawback of being incapable of comparatively high speeds, even though they do possess the advantages of hovering flight and very low landing speeds.

An aircraft constructed in accordance with the invention uses air compressors of one type or another, and these are mounted in upwardly opening ducts at the top part of the body of the aircraft. The ducts also open laterally and vertically to the body of the aircraft and provide jet streams of air under pressure when the compressors are in operation. Directional control is achieved by an arrangement of deflectors located at the discharge ports of the ducts and adapted to be adjusted so that the resultant of the airstream and its deflection may be controlled to impose various directional forces on the aircraft body.

Accordingly, it is another object of the invention to provide an aircraft capable of hovering and which is supported and propelled by means of streams of air directed and controlled by novel arrangement of ducts and remotely controlled deflectors.

It is another object of the invention to provide an aircraft having a low center of gravity thereby increasing the stability of aircraft.

Still another object of the invention is to provide an aircraft whose movement in any direction is under the control of the pilot.

It is yet another object of this invention to provide novel deflectors for directing and controlling lifting and propelling airstreams issuing from an aircraft and which are operated and controlled by a reliable and efficient mechanism.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of an aircraft constructed in accordance with the invention;

FIGURE 2 is a top view of the aircraft in FIGURE 1;

FIGURE 3 is an enlarged sectional view taken on the line 3—3 of FIGURE 2;

FIGURE 4 is a diagrammatic view showing five air deflector motors which occupy one quadrant of the aircraft, there being three additional groups of motors which are not shown, and this view also diagrammatically illustrating controls for energizing the motors and causing them to adjust the air deflectors;

FIGURE 5 is an enlarged fragmentary sectional view showing one of the motors in FIGURE 4 and the air deflector which it operates;

FIGURE 6 is a sectional view similar to FIGURE 5 but showing the air deflector in a retracted position;

FIGURE 7 is a sectional view taken on the line 7—7 of FIGURE 6.

FIGURE 8 is a sectional view of a modification showing a hydraulic motor connected to a hydraulic system substituted for the electric motor and system;

FIGURE 9 is a diagrammatic view showing the power plant for the aircraft and also showing that the compressors may be automatically or manually controlled;

FIGURE 10 is a further diagrammatic view to be considered in conjunction with FIGURE 9 and showing further that additional automatic control for the compressors may be resorted to;

FIGURE 11 is another diagrammatic view showing the choice between manual and automatic directional control for the deflector motors;

FIGURE 12 is a fragmentary partially sectional and partially elevational view showing that the type of compressor shown in FIGURE 3 for instance, may be substituted by another type of compressor;

FIGURE 13 is an enlarged cross sectional view taken substantially on the vertical plane of line 13—13 of FIGURE 2; and FIGURE 14 is a diagrammatic view showing the means for controlling the rotation of the aircraft about its vertical axis.

In the accompanying drawings there is an illustration of an aircraft 10 which has an aircraft body of unusual configuration. The upper part 12 of the body has an upper wall 14 shaped generally in the form of a very shallow dome, and there is a pilot and crew cabin 16 also formed as a smaller dome having windows 17 therein. The dome 16 is located at the center and at the top part of wall 14. The side wall of the body is circular in plan form, and the side wall is smoothly curved in cross section. The lower wall 18 of the uper part of the aircraft body is dished inwardly and has a number of windows 20 therein. Wall 18 curves downwardly to form a stem-like lower part 22 and the general appearance of the aircraft when viewed from the side resembles a mushroom.

The tricycle landing gear shown in FIGURE 3 is indicated by the reference numeral 24. It includes landing wheels 26, a scissors brace linkage 27—28 and an oleo strut 30 at the juncture of the links of scissors linkage 27—28 and pivoted to the frame structure 32 of the aircraft. The landing gear 24 is preferably retractable as illustrated in FIGURE 1, and when retracted, the apertures 33 are closed by fairing members 31. The landing gear may be operated to its retracted position by conventional means, not shown, such as hydraulic or electrical motors.

The aircraft structure 32 has a central shaft 34 (FIGURE 3) which accommodates various lines which extend from power plane 36 to the four compressors 38, 40, 42 and 44. Power plant 36 is preferably an atomic reactor and it is disposed in power plant compartment 46 that is properly shielded and which is located at the lower part 22 of the aircraft so as to lower its center of gravity.

It is specifically pointed out that the atomic reactor 36 is the preferred power plant, but the aircraft 10 could be made to function by using other conventional power plants. When an atomic reactor (FIGURE 9) is used as the power plant, the conventional power transfer system will be required. Steam generator 48 is operatively connected with the reactor 36, and there is a turbo-electric generator 50 operatively connected with the steam generator. Generators 48 and 50 are conventional. Steam from the steam generator passes through one or more conduits 52 in order to operate the steam turbines which constitute part of the four air compressors or propellers 38, 40, 42 and 44. Further details of the application of steam to the steam turbines will be given below.

The upper part 12 of the aircraft body has aerodynamic ducts formed therein, the two ducts 56 and 58 being shown in FIGURE 3 and it being clearly understood as can be seen in FIGURE 2 that there are four individual ducts, each being identical, and one provided for each of the four air compressors. Duct 58 has an outwardly flared or curved air inlet which opens upwardly through the top wall 14. Compressor unit 44 in the embodiment of FIGURE 3, has a steam turbine which drives a propeller 45 located in a portion of the air inlet 58. Compressor 44 is supported by mounting bracket 60 that is suitably secured to the frame structure 32. The side wall 64 of duct 54 is smoothly curved in cross section. The lower ends of each of the vertically extending ducts 56, 57 and 58, 59 branch out into a plurality of individual horizontal ducts such as shown in 64 in FIGURE 3. Preferably there are five individual horizontal ducts connected to each vertical duct and illustrated in FIGURE 1. The discharge end 64 of the total cross sectional area of each group of ducts 54 is smaller than the total cross sectional area of its corresponding vertical duct to allow for an efficient pressure build-up behind the propellers in the vertical duct in advance of the outlet of discharge upon the horizontal ducts. Also, the total area of the discharge ports 66 at the terminal part of the vertical duct is considerably smaller in cross sectional area than the inlets to the vertical ducts, and as shown in FIGURE 3, the part 64 of the horizontal duct is arched so that the discharge axis 68 of the duct is downwardly and outwardly with respect to the direction or line of flight of the aircraft when flying horizontally. The discharge axis is shown in FIGURE 3 at 68.

As shown in FIGURES 1 and 2, each group 6, 7, 8 and 9 of discharge ports 66 are arranged around the periphery of the aircraft so as to the spaced substantially 90 degrees from one another. Since there are four groups of identical ducts for each of the four compressors spaced 90 degrees around the periphery of the aircraft, lateral control is quite easily obtained. With the discharge axis 66 of each port angled downwardly and outwardly as described above, the thrust obtained from an issuing gas stream, will have a horizontal and vertical component to provide horizontal flight and also to provide an overcoming force in a vertical upward direction tending to provide a lift for vertical flight.

Attention is now directed to FIGURE 12 showing a modification of the compressing means. The compressor 44a is supported by mounting bracket 60a at the inlet 58a of duct 54a, but the compressor or power plant is a different type than previously disclosed. The compressor 44a and each of the other three compressors have individual steam inducting lines extending from the steam generator 48 to the compressors. Each of the individual steam lines has an adjustable valve therein individually controlled by the pilot of the aircraft. The valves are of the conventional type and therefore are not shown in the drawings. The housing of the compressor 44a preferably has a vertically extending venturi passage therethrough. The passage through the housing 44a also has a plurality of steam ejecting nozzles therein connected to the steam supply pipe and each of the nozzles points primarily in a downward direction but is inclined slightly radially inwardly of the duct. When the steam control valves for the compressor 44a are open, the nozzles in the compressors ejects steam downwardly as indicated by the arrows in FIGURE 12 so as to compress the gases below the compressor and create a suction at the entrance of the compressor as indicated by the arrows. The steam and air are ejected from nozzle 66a in a manner similar to the ejection of gases from nozzle 66. The specific details of the nozzles and their specific arrangement are conventional and since they form no part of this invention, they are not shown in the drawings.

Each port 66 in each group of discharge ports of the four ducts defines a discharge nozzle for air compressed by means of a compressor such as shown in FIGURE 3 or compressed by compressor 44a regardless of whether the steam is directly used in compressor 44a or used to operate a steam turbine 44.

Flight control in all directions is obtained by adjustment of deflectors 70 in conjunction with control of the compressors. There is one deflector for each discharge port or nozzle 66 as shown in FIGURES 5 and 6. A typical deflector 70 is arcuate in cross section and is extensible and retractable in a curved path to direct the jet stream issuing from the discharge nozzle 66. As shown in FIGURES 5 through 8, a typical deflector 70 is constrained in its movement by being mounted between upper and lower guides 72 and 74, which may be roller guides supported by a vertically extending portion of the aircraft structure. Laterally extending flanges 70 on each side of the gear portion 88 extend into guide 76 fixed to the aircraft structure thereby preventing lateral displacement of the deflector 70.

One of the previously mentioned electric motors 78 is shown in FIGURE 5, this electric motor has a motor shaft 80 extending therefrom and has a worm 82 fixed to the shaft 80. The worm is in engagement with the pinion worm 84 mounted for rotation on a fixed spindle 86 which is rotatably attached to a part of the frame structure 32. The motors are supported on the frame by means of brackets 33. Gear segments 88 are fixed to one surface of each deflector 70 and are enmeshed with worm wheels 84. Upon energization of any motor 78, the gearing causes the deflector 70 to be retracted or extended depending upon the direction of rotation of the motor. It is preferred that motor 78 be a conventional reversible motor to facilitate extension and retraction of the deflector 70. When a deflector 70 moves from its withdrawn position, FIGURE 6, it passes through a small slot 90 in side wall 16 of aircraft body and assumes a position radially outwardly spaced from nozzle 66 to function as a deflector for the jet stream issuing therefrom. By changing the direction of the jet stream, the force components of the stream are altered, that is the vertical component is increased or decreased depending on whether the horizontal component increases or decreases, and this change is in direct function of the position of deflector 70.

It is to be understood that an electric system need not be used. When an electric system is used, its components including the wiring, the limit switches and the like will be selected from conventional equipment which is commercially available or will be adapted from available equipment but engineered to suit the aircraft, the same holds true of a hydraulic system used with the modified motor shown in FIGURE 8, wherein a hydraulic motor 78a is illustrated. The hydraulic motor is coupled by means of a pivot 90, brackets 92 and the shaft of the hydraulic motor to the deflector 70a. The guide system for the deflector is the same as used with an electric operation arrangement. The functional utility of deflector 70a is precisely the same as that of deflector 70.

FIGURE 4 shows a diagrammatic representation of one group of motors. Motor 78 has been previously described as to function. Motors 100 and 102 are located on opposite sides of motor 78 and as shown from the schematic wiring, motors 78, 100 and 102 are simultaneously energized. Motors 104 and 106 flank motors 100 and 102 respectively, and separate cables 108 and 110 are shown operatively connected therewith since these motors are individually controlled. The groups of five motors such as the group shown in FIGURE 4, for the three additional quadrants are not shown, although the cable connections for each are illustrated. Considering now the procedure for lateral control of the aircraft, electrical power input from generator 50 is obtained by cable 112 which feeds two multi-position switches 114 and 116. These switches may be made quite simple, consisting of a movable contactor and a number of fixed contacts. Switch 114 is arbitrarily termed a forward and reverse switch implying flight direction. Switch 116 is arbitrarily designated a left-right switch further implying flight direction. When switch 114 is operated, there is power from cable 112 directed by way of the switch to cables 118 or 120 or 122. Assuming that cable 122 is energized, current flows to cable 110a and 110b by way of slip ring and brush assemblies 124 and 126 inasmuch as the center part of the switch assembly is preferably stationary with respect to the aircraft. The switch assembly can be built in platform 128 forming the floor of cabin 16 so that the pilot and his crew always maintain a fixed rotational position while the balance of the aircraft can rotate about the vertical axis of the aircraft. This is an optional feature as it is preferred that the floor of the cabin 16 be fixed to the aircraft structure so as to rotate with the aircraft when and if the aircraft is rotated.

When cables of 110a and 110b are energized, the right rear motor in the rear quadrant and the left forward motor in the forward quadrant are energized simultaneously with the motors operating in opposite directions so that for instance, the right rear deflector of the rear quadrant is withdrawn while the left front deflector in the forward quadrant is extended, and this will cause the aircraft to pitch slightly since the front of the aircraft will move upwardly relative to the rear portion thereof. If cable 118 were energized, cables 108a and 108b would also be energized through the switch 114 to cause a similar control force to be exerted on the aircraft. If cable 120 were energized by operation of switch 114, cables 107a and 107b which feed the center three motors responding to motors 78, 100 and 102 would be simultaneously operated with the forward deflectors projecting from the aircraft while the rear deflectors retract and vice versa. Inasmuch as the motors are reversible motors, limit switches may be provided or switch 114 may be made a dual switch with two separate groups of contacts, one for movement of the motors in one direction and the other for energization of the motors in the other direction. For instance, there may be a left and a right group of contacts and two vertical planes spaced from each other, and the contactor of the switch may be on a pivot such as a ball joint, so that it may be swung left or right to energize the selected contacts of a given group.

Operation of switch 116 will cause a very similar functioning of the motors in the left and right quadrants. Switch 116 obtains energy from cable 112 by way of cable 113 that is secured thereto. There are three cables 130, 132 and 134 extending from switch 116. Assuming that cable 132 is energized, cables 107 and 107c will also be energized by way of the slip ring and brush assemblies, and this will cause the three motors 78, 100 and 102 to be simultaneously energized with the three motors (not shown in figure) in the opposing quadrant. These are thrust motors, just as the motors which are energized by cables 107a and 107b, and the principal function is to provide lateral or side thrust, either left or right, while the motors energized by 107a and 107b are used principally to provide forward and rearward thrust. The terms forward and rearward are used merely in explaining the operation of the wiring diagram shown in FIGURE 4 since the exterior shape of the aircraft is symmetrical about any vertical plane passing through its vertical axis, and the aircraft has no true front or rear as in conventional aircraft. The aircraft being symmetrical, it is clear that it may be flown in any direction on the compass by merely manipulating switches 114 and 116 to the proper position. Cables 130 and 134 energize the flanking motors 106 and 104, respectively and the correspondingly, diagonally opposed motors of the group in the opposing quadrant. When any of the described motors are in operation, the deflectors connected therewith are, of course, actuated. As was previously indicated, the electrical system may be substituted by a hydraulic system with valves taking the place of the switches and hydraulic motors taking the place of the electrical motors. It is contemplated that the switches 114 and 116 each have two full speed positions which is obtained by moving the control levers of these switches either to the extreme forward or extreme reverse positions. The full speed positon operates all five motors in each of two opposing groups at the same time.

One of the pair of switches shown in FIGURE 4, is duplicated in FIGURE 11. The power input line 112 is shown connected with switch 116, but there is a selector switch 140 between the power output lines of switch 116 and one typical motor 78, it being understood that the other motors are not shown in this view for simplicity of illustration. Selector switch 140 is connected between a switch 143 controlled by a directional gyroscope 142 and the manual control switch 116. This view shows that an automatic pilot or a directional gyroscope of conventional description may be used to operate the various motors in the control system of the aircraft.

FIGURE 9 shows diagrammatically a control system for each of the four compressors. Valve 156 is in a steam conduit 52 which feeds steam pressure to the east and west compressors from generator 48. Valve 156 is located in line 152 and is operated by solenoid 157 while supplying or cutting off or regulating the amount of steam going into the east or west compressors. A solenoid or valve 156 is controlled by a manual control switch 150 or an automatic altimeter control switch 158. Selector valve 152 is employed for selectively connecting the manual control or the automatic control 158 to the solenoid 157. When the east and west compressors are on automatic control the altimeter switch 158 may be manually set so as to automatically maintain the aircraft at any desired altitude.

Alternatively, each of the four compressors would be individually controlled by the apparatus shown in FIGURE 9. In such an arrangement, there would be four separate systems, one for each of the compressors, and the four valves 150 would be arranged side-by-side in a manner commonly used for arranging its valves in multi-engine conventional aircraft. In such an arrangement, the handles 150 for the control switches for the east and west compressors would be arranged side-by-side, and in addition to those two switches the north and south switches would be arranged side-by-side whereby all four switches would be controlled by one hand of the pilot.

The control system shown in FIGURE 10 is designed to control the north and south compressors and is intended to be used in conjunction with the system shown in FIGURE 9 for controlling the east and west compressors. When these two systems are used together, it is contemplated that the aircraft will have a point on its periphery which will in effect comprise the front thereof so that the aircraft will always be orientated in the same direction in relation to its path of movement. The pitch detector switch 160 is controlled by an automatic means such as a gyroscope which may be used in place of the manual control 151 for the north and south compressors. Selector switch 162 permits the pilot to select between manual control and automatic control by means of the pitch detector switch 160. An electric valve 164 is of a rotary type and operated by a reversible motor 163 which is either connected by means of switch 162 to the pitch detector switch 160 or the manual switch 151. An electric valve 164 applies more or less steam to the north and south compressor depending on the direction of the voltage output from the pitch detector or manual control. If separate lines are desired, the pitch detector may use a balancing bridge so long as the power output is such that the motor of the electric valve 164 is energized in the proper direction to make correction of the flight attitude of the aircraft by applying more or less steam to the north or south compressors. A Selsyn motor system is ideally united for this application.

In understanding the operation and effect of the vane 70, reference is made to FIGURE 3. As shown in this figure, the right vanes 70 are fully retracted and the left vanes 70 are fully extended. As shown by the arrows T and T', the gases exhausting from the nozzle 66 move downwardly to the right. This in turn causes a reaction which moves the aircraft to the left. Since all nozzles at both the front and the rear of the aircraft are producing thrust, maximum horizontal velocity and efficiency are thereby produced. When it is desired to hover, or rise in a vertical direction, all the vanes 70 partially retract so that the gases exhaust from the nozzles 66 in a vertical direction. This provides maximum lift and therefore maximum climbing speed. For descending the aircraft in a straight downward direction, all the vanes are either retracted or extended an equal amount and power to the compressors 40 through 44 is reduced accordingly. If the aircraft is for example moving north and it is desired to suddenly move the aircraft in a westerly direction, then the vanes on the right side of the aircraft are retracted and the vanes on the left side of the aircraft are extended while at the same time the vanes at the rear of the aircraft are extended an amount equal to the extension of the vanes at the front of the aircraft. Thus it can be seen that the aircraft can change its direction of flight without rotating about its vertical or yaw axis.

Pitch of the aircraft is controlled by regulating the fore and aft deflectors 70 or by controlling the relative power between the fore and aft compressors. Likewise, roll of the aircraft may be controlled by the deflector 70 on each side of the aircraft as well as the relative speed of the compressors on opposite sides of the aircraft.

FIGURES 9 to 11 principally show that by following the design principles and using automatically controlled devices employed in conventional aircraft, the aircraft 10 may be controlled either automatically or manually in flight.

Referring to FIGURE 3, it can be seen that the horizontal ducts 64 are separated by vertical partitions 57 having streamlined inner edges 55.

To prevent rotation of the aircraft in flight, it is contemplated that two of the propellers of the compressor units will rotate in a clockwise direction and the other two propellers will rotate in a counter-clockwise direction so as to neutralize the torque produced by these propellers. Also, rotation of the aircraft may be produced or prevented by controlling the relative speed of the propellers thereby producing an unbalanced torque force on the aircraft tending to rotate it in one direction. The direction of the rotation of each propeller is indicated by the four arrows in FIGURE 2. The pitch of the propellers rotating in a clockwise direction is just the reverse of those rotating in a counterclockwise direction. All the propellers force air downwardly and out of exhaust ducts 66.

To simplify control of the aircraft about its vertical or yaw axis, an additional means may be employed thereon for controlling its rotation about this axis. Referring to FIGURES 2, 3, 13 and 14, it may be seen that nozzles 170 and 172 may be installed within the aircraft adjacent one edge thereof. These nozzles face in opposite directions and are inclined slightly upwardly and parallel to enclosed ducts 174 and 176 which have openings 178 and 180 on the upper surface of the aircraft. As shown in FIGURE 14, the jet nozzles 172 and 170 are connected by means of passageways 184 and 182 to a three-way valve 186 which in turn is connected by a passage 200 to steam generator 48. Located in the pilot's compartment is a manually controlled switch 200 and selector switch 204. The switch 200 is connected to solenoids 188 and 190 by means of leads 198 and 196 respectively. The three-way valves is of the reciprocating type having a control plunger therein which has armatures 192 and 194 fixed to its ends extending through the solenoids 188 and 190. To rotate the aircraft in a counter-clockwise direction or to prevent it from rotating in a clockwise direction, the pilot moves the switch handle 201 in a downward direction from its neutral position thereby energizing solenoid 188 which operates three-way valve from its closed position to a position to connect line 206 with line 182 thereby permitting steam to flow from steam generator 48 to the nozzle 170 and out of opening 178 so as to impose a rotational force on the aircraft 10 tending to rotate it in a counter-clockwise direction. If it is desired to rotate the aircraft in a clockwise direction or prevent it from rotating it in a counter-clockwise direction, the pilot raises the handle 201 of the rheostat 200 the desired amount so as to energize solenoid 190 a correspondingly desired amount thereby moving armature 192 to the left to open the three-way valve so as to cut-off passageway 182 and connect passageway 184 to the stream generator thereby energizing jet 172. This causes a jet of steam to flow out of opening 180 as indicated by the arrow in FIGURE 2 thereby creating a clockwise rotational force or torque upon the aircraft 10. If it is desired to prevent rotation of the aircraft by automatic means, then switches 204 are closed and valve handle 201 is left in its neutral position, as shown in FIGURE 14. Gyroscopic control switch or rheostat 202 then automatically operates three-way valve 186 to control jet nozzles 172 and 170 as necessary to prevent rotation of the aircraft. Valve 186 is normally held in a neutral, closed position by internal spring means.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In an aircraft having a body provided with an upper wall, a circular side wall and a bottom wall, a plurality of ducts within said walls, each duct having an inlet which opens through said upper wall and a plurality of discharge nozzles which open outwardly and downwardly through said side wall and which have discharge axes extending outwardly and downwardly with respect to the vertical axis of the aircraft body, said ducts being arranged to define quadrants, airstream direction changing deflectors, means movably mounting said deflectors on the aircraft body, means connected with said deflectors for propelling said deflectors to a position at which portions of the deflectors are in the airstreams passing from said nozzles to thereby change the direction of flow of air extending through said nozzles and thereby imposing reaction forces on the aircraft body to alter the attitude and flight direction of the aircraft body, at least some of said deflectors in opposing quadrants being operative simultaneously and in synchronism, and means for so synchronously and simultaneously actuating some of said deflectors, air compressors in said ducts to induce an airstream therethrough, and control means connected with said air compressors for operating at least some of said air compressors synchronously.

2. The subject matter of claim 1, wherein said deflectors comprise curved deflector plates, said side wall having openings therein, and said curved deflector plates being movable in said openings between the retracted and extended positions respectively.

3. In an aircraft having a body provided with an upper wall, a circular side wall and a bottom wall, a plurality of ducts within said walls, each duct having an inlet which opens through said upper wall and a plurality of discharge nozzles which open outwardly and downwardly through said side wall and which have discharge axes extending outwardly and downwardly with respect to the yaw axis of the aircraft body, said ducts being arranged to define quadrants, airstream direction changing deflectors, means movably mounting said deflectors on the aircraft body, means connected with said deflectors for propelling said deflectors to a position at which portions of the deflectors are in the airstreams passing from said nozzles to thereby change the direction of flow of air extending through said nozzles and thereby imposing reaction forces on the aircraft body to alter the attitude and flight direction of the aircraft body, said deflectors each comprising an arcuate plate oscillatable about a horizontal axis, an inner surface of each plate being parallel with an adjacent surface of one of said discharge nozzles, said means for propelling said deflectors comprising an arcuate rack fixed to the outer surface of each of said deflectors, a pinion rotatably mounted within the edge of said aircraft and operatively engaging said rack, and remotely controlled power means connected with said pinion for rotating same.

4. In an aircraft which has a circular aircraft body, the body provided with a plurality of separated ducts having air inlets and a plurality of discharge nozzles at the arcuate periphery of the aircraft body, a compressor in each duct to draw ambient air into the inlets of the ducts and to discharge the air as a jet stream through the discharge nozzles of the ducts, arcuate control deflector means comprising curved deflectors mounted within the body of the aircraft immediately above each nozzle and said deflectors being capable of moving outwardly from the body of the aircraft so that the curved ends of the deflectors intercept the jet streams of the nozzles to the lesser extent or greater extent that they curve downwardly into the discharge streams of the nozzles, said deflectors in their fully retracted positions making no contact with the discharge streams of the nozzles, means mounting said deflectors as movable elements on the body of the aircraft above said nozzles and jet streams and regulating the movement of the deflectors so that the movement thereof is between a position at which at least a portion of the deflectors extends into the paths of movement of the discharge streams from the nozzles and at an open position at which deflectors are essentially removed from any contact with the discharge stream of the nozzles.

5. The subject matter of claim 4 wherein each nozzle has the axis of its discharge stream arranged at approximately a 45° angle to the vertical axis of the circular aircraft body.

6. The subject matter of claim 5 wherein there are means for synchronously operating said deflectors to obtain coordinated control of the direction of the jet streams from said nozzles.

7. The subject matter of claim 6 wherein there are means for controlling the operation of said compressors individually so that the force of the jet streams issuing from the nozzles at selected positions of the aircraft may be individually varied thereby resulting in a change in the attitude of the aircraft.

8. In an aircraft which has an aircraft body of generally circular plan form, said body having an upper wall, a side wall and a lower wall, a plurality of ducts between said upper and lower walls, each duct having an air inlet which opens through said upper wall, a compressor in each inlet separately controlled, and a plurality of discharge nozzles which open through said side walls, each of said compressors inducing an airstream through said duct inlets and out of said discharge nozzles, and flight control means carried by said aircraft body and adjustable to selected positions for deflecting the jet airstreams which issue from said discharge nozzles in either a downward or lateral direction relative to the aircraft, said flight control means consisting essentially of a plurality of deflectors, means mounting said deflectors in said aircraft body for movement to regulated positions intercepting and hence deflecting the discharge airstreams issuing from said nozzles.

References Cited in the file of this patent
UNITED STATES PATENTS
2,838,257    Wibault _____ June 10, 1958